Aug. 28, 1951     G. A. TINNERMAN     2,565,636
SPRING LATCHING FASTENER
Filed Nov. 8, 1946

INVENTOR
GEORGE A. TINNERMAN
H. G. Lombard
ATTORNEY

Patented Aug. 28, 1951

2,565,636

UNITED STATES PATENT OFFICE 2,565,636

SPRING LATCHING FASTENER

George A. Tinnerman, Cleveland, Ohio, assignor to Tinnerman Products, Inc., Cleveland, Ohio, a corporation of Ohio Application November 8, 1946, Serial No. 708,476

9 Claims. (Cl. 292—76)

This invention relates in general to improvements in spring latch or snap fastening closure fasteners for securing the parts of an installation, and is directed, more particularly, to the provision of improved, simplified and relatively inexpensive spring fasteners of this character that are easily and quickly assembled and applied to complete an installation in a minimum of time and effort.

A primary object of the invention is to provide an improved latch type of spring fastener which is adapted for a wide range and variety of applications in closure installations and the like, wherein a door or cover plate, for example, is secured over an inspection opening or access hole, and, in related types of assemblies in which complementary or cooperating parts are secured in juxtaposed or superposed relation, or, in any equivalent construction in which an object is retained on a supporting part to conceal or enhance a portion of the same.

Another object of the invention is to provide an improved, simplified spring fastener of this character which comprises combined attaching means and spring latching or spring catch means in a simple unitary clip device that is adapted to be readily installed and expeditiously applied to fastening position to complete a closure installation or equivalent assembly of juxtaposed or superposed parts.

A further object of the invention is to provide such a spring fastener which includes integral anchoring means for retaining the same in attached position without the use of bolts, nuts, screws or other extraneous fastening means.

Another object of the invention is to provide an improved closure fastener or similar spring clip device of the kind described which is strong, durable and reliable and is adapted for economical quantity production at comparatively low cost in that it may be manufactured from standard sheet metal strip stock with little loss or waste of material.

Further objects and advantages of the invention will be readily apparent as the following description proceeds with reference to the accompanying drawings, for purposes of ilustration but not of limitation, in which like reference characters designate like parts throughout the same, and in which.

The present invention has particular application in closure fastener installations wherein a part serving as a cover or closure plate must be firmly and rigidly secured against displacement or disassociation from the supporting structure but capable of being readily removed or operated to open position to permit access to the area concealed by the cover or closure plate. In this relation, the invention is admirably suited for use as a spring latch type of fastener for securing the doors or covers to compartments in various forms of cabinet structures and the like. Likewise, the improved spring fastener is adapted for securing superposed or juxtaposed parts in a similar relation wherein the spring fastener is attached to a flange, stud or rib on a supporting part with the spring latching element thereof in position for retaining an associated part in overlying relation to the supporting part in the general manner by which a spring latch or spring catch operates to hold a cabinet door in closed position relative to a compartment in a cabinet, casing or the like.

Figure 1:
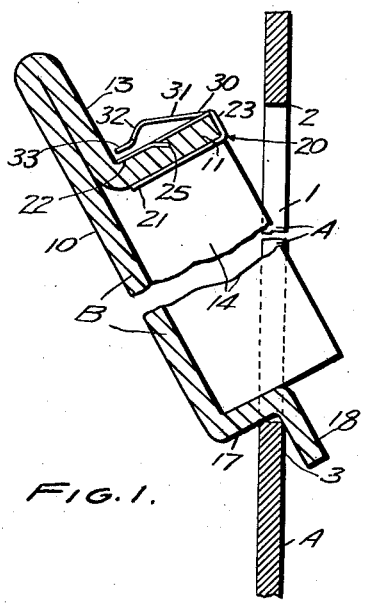
Fig. 1 is a vertical sectional view showing the improved spring fastener of the invention as attached to a door or cover plate to secure the same over an opening in a panel or other support, the door or cover plate being shown in partly open position.
Figures 2, 3:
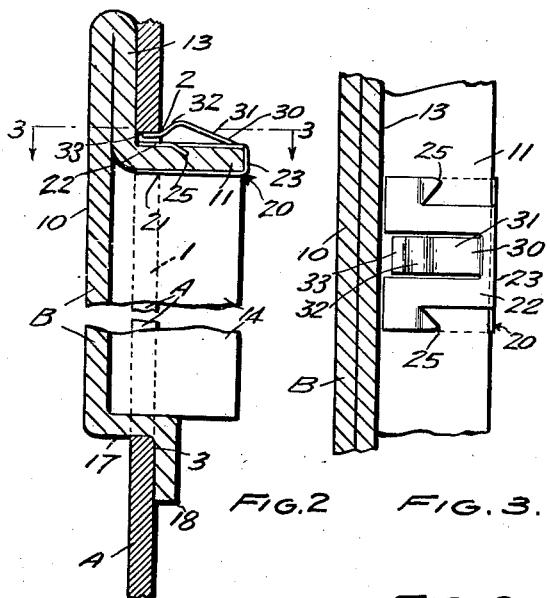
Fig. 2 is a view similar to Fig. 1 showing the door or cover plate in closed position and secured by the improved spring fastener of the invention.
Fig. 3 is a sectional view on line 3—3 of Fig. 2 looking in the direction of the arrows, and showing the improved spring fastener in side elevation.
Figure 4:
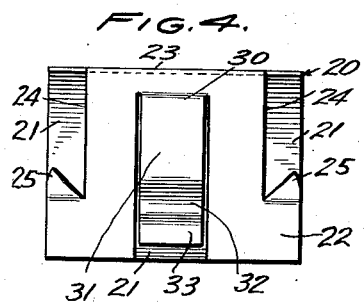
Fig. 4 is an enlarged side elevational view of the fastener per se.
Figure 5:
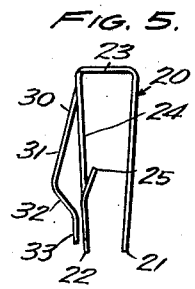
Fig. 5 is an end elevational view of the fastener seen in Fig. 4.
Figure 6:
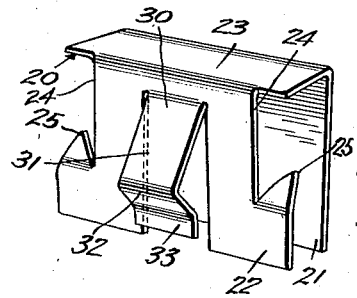
Fig. 6 is an enlarged perspective view of the fastener shown in Figs. 1-3 inclusive.

Referring now, more particularly, to the drawings, Figs. 1-3 inclusive illustrate the application and use of the spring fastener shown in Figs. 4-6 inclusive, as employed in a door or cover plate assembly serving as a closure to a compartment in a cabinet, casing, housing or similar installation. The part A, Fig. 1, represents a panel or any other member provided with an opening 1 bordered by a flange 2 and adjoining surfaces of any desired contour or outline. In the present example, the opening in part A is provided by a simple cutout area in a panel by which the flange 2 is provided along with another flange 3 opposite thereto and flanges at the sides of the opening. The part A may be of any selected sheet metal, wood, or fibre-board material, or may comprise a plastic part molded in any desired form with an opening defining a flange 2 having a free edge, as aforesaid.

The part B represents a door, cover plate, trim panel or other type of closure overlying the opening in part A and adapted to conceal the same as shown in Fig. 2 or to be moved to open position relative thereto as illustrated in Fig. 1. The part B, likewise, may be made of any selected metal, wood, plastic or fibre-board material to comprise a plate-like member 10 having a side rib 11, rib section or equivalent stud projecting from the underside thereof in generally normal or other angular relationship thereto. In the present example, the part B is shown as a metallic panel member which has its peripheral edge portions bent inwardly to provide a peripheral inwardly extending rim which approximates the size and contour of the periphery of the opening 1 in part A. The rim includes the side rib 11 that is bent generally normal to a return bent portion 13 on the underside of panel 10 which defines a projecting abutment or stop on said cover panel or door 10. End ribs 14 similar to side rib 11 may be provided along the ends of the door or panel, while the lower side rib 17 includes an outwardly projecting hook portion 18, or the like, serving as a hinge means by which the door is pivotally supported on the lower flange edge 3 of the opening 1 in part A, substantially as shown in Fig. 1.

The door, closure or other part B is applied to assembled relation in the opening 1 in part A as shown in Fig. 1 by inserting the hook portion 18 through the opening to overlap the inner edge portion of lower flange 3 bordering said opening. When the door is moved to closed position shown in Fig. 2 the side rib 11 and end ribs 14 are snugly received within the opening 1 in part A in the position determined by the abutment or stop 13 in engagement with the adjacent outer surface of the flange 2, with the hook portion 18 engaging the marginal inner edge portion of flange 3 to maintain the door against removal from the opening along the lower side thereof.

When the door or cover B is in closed position as shown in Fig. 2, the rib 11 extends in normal or other angular relationship to the adjacent marginal edge of flange 2 bordering the opening 1 in part A. In this relation, the spring fastener 20 is designed to effect a snap fastening connection between the rib 11 and adjacent flange 2 on the parts B and A, respectively, in functioning as a spring latch type of fastener for holding these parts in closed position.

As shown in Figs. 3-6 inclusive, the spring fastener, designated generally 20, is made in a highly simplified and inexpensive design from a relatively small length of any suitable sheet metal, preferably of a spring metal nature such as spring steel or cold rolled steel having spring characteristics, with the size, finish and thickness thereof selected according to service requirements and the predetermined size and nature of the parts of the installation. The fastener is readily manufactured by simple bending and forming operations by which the strip or sheet metal body is bent intermediately to define a pair of spaced arms 21, 22, united by a web portion 23 and extending in the same general direction. The arms 21, 22 have a normal spacing slightly less than the thickness of flange 11 to serve as article gripping members adapted to receive said flange 11 and tenaciously grip the same in assembled relation therewith.

The arm 22 is provided with cutout portions 24 along its side edges which are so designed as to define anchoring means in the form of spurs, prongs, or the like, 25, having their points extending toward the bight between the arms 21, 22 and bent inwardly toward the arm 21. A resilient spring element in the form of a spring finger 30 is provided by spaced longitudinal slits in the arm 22 and said finger is bent outwardly out of the plane of said arm and so formed as to define an outwardly inclined guide surface 31 merging into an inwardly inclined cam shoulder 32 having a cooperating detent 33 adjacent thereto.

With the spring fastener 20 provided in the general manner described and substantially as shown in Figs. 4-6 inclusive, it will be understood that the fastener is employed in an assembly such as shown in Figs. 1 and 2 by being applied to attached relation on the side rib 11 of part B in position for the spring finger 30 to effect a snap fastening connection with the edge of flange 2 on part A. In the case of a relatively large assembly, as many spring fasteners 20 as are necessary or desirable may be attached to the side rib 11 and also to the end ribs 14 depending on the size of the door, closure or other object and the strength required in the securing of part B to part A. The spring fastener 20 is attached to the rib 11 by spreading the arm 22 from the arm 21 as necessary to pass the rib between said arms, whereupon the web 23 of the fastener is pushed to advance the fastener on said rib to the applied position thereof shown in Fig. 1. The inturned prongs 25 point away from this movement of the fastener on the rib 11 and thereby permit the same to be advanced to its applied position thereon where said prongs dig into and become embedded in the adjacent surfaces of the rib 11 and prevent any displacement or reverse movement of the fastener in the opposite direction toward removal from applied position on said rib. To this end, the spring arms 21, 22 are biased inwardly toward each other as seen in Fig. 5 and thereby strongly force the prongs 25 into embedded, anchored engagement with the rib 11 at all times.

With the spring fastener 20 applied to the rib 11 substantially as shown in Fig. 1, the spring finger 30 thereof extends into the path of the edge of flange 2 on part A. Accordingly, when the door, closure or other object B is pushed to the closed position shown in Fig. 2, the guide surface 31 of said spring finger undergoes a camming action against said flange edge 2 which causes a gradual compression of the spring arm 30 as necessary for the cam shoulder 32 to snap into engagement with and ride on the corner of said flange edge. The resultant camming action of the cam shoulder 32 on the flange edge 2 automatically draws the door B to its closed position and maintains the same in such position under the resilient spring force of the compressed spring finger 30. In this relation, the detent 33 cooperates with the cam shoulder 32 in latched relation with the flange 2 by engaging the wall of the opening 1 bordering said flange to rigidify the connection thus provided.

The door or part B may be opened and otherwise separated from part A as shown in Fig. 1 by a simple pull on a knob or handle (not shown) attached to the door, or, a suitable pointed tool such as a screw driver may be inserted under the door abutment 13 to wedge the same away from part B. In any case, the transverse force thus exerted on the spring latching finger 30, forces the cam shoulder 32 against the flange edge 2 to cause a compression of the spring finger as necessary for said cam shoulder to clear the panel opening and permit the door to be opened.

Figure 7:
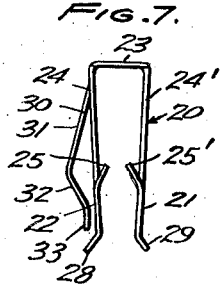
Fig. 7 is an edge elevational view of a modified form of the improved spring fastener.

Fig 7 shows a modified form of spring fastener 20 which is generally similar in construction, application and use to that disclosed in Figs. 1–6 inclusive and, in addition, includes cutout areas 24' on arm 21 defining inturned prongs 25' which cooperate with the inturned prongs 25 on arm 22 to provide added anchoring means for retaining the spring fastener in attached relation on the flange or rib 11.

Either one or both of the spring arms 21, 22 have their free ends bent outwardly to define flared lips 28, 29, which provide an enlarged entrance between said arms facilitating application of the clip to the rib or flange 11 on the door or other part to be secured. The arrangement is such that in applying the fastener to the rib 11 the flared lips 28, 29, readily receive the rib and cam against the corner edges thereof to cause an automatic expansion of the spring arms as necessary for the fastener to be easily and quickly advanced to attached position on the rib substantially as shown in Figs. 1 and 2.

Figure 8:
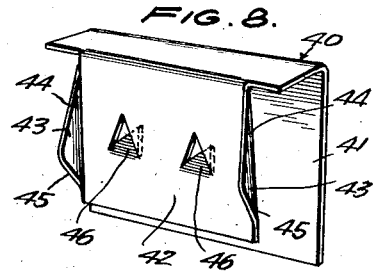
Fig. 8 is a perspective view of a further embodiment of the improved spring fastener; and, Fig. 9 is an end elevational view of the fastener shown in Fig. 8.
Figure 9:
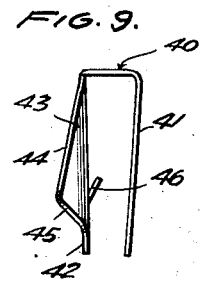

Figs. 8 and 9 illustrate a further embodiment of the invention comprising a spring fastener 40 which is applied and used in the same general manner as that described with reference to Figs. 1–6 inclusive. The fastener, similarly, comprises a pair of spaced arms 41, 42, with the spring latching means on arm 42 provided by cutout areas on the sides or edges thereof defining tongues or wings 43 which are bent angularly outwardly out of the plane of said arm. Each resilient tongue 43 includes an outwardly inclined guide surface 44 merging into an inwardly inclined cam shoulder 45 adapted to provide a spring latching effect in the same general manner as the spring finger 30 of the fastener shown in Figs. 1–6 inclusive. The arrangement is such that each of the resilient tongues 43 is in outwardly disposed angular relationship to the arm 42, and is adapted to be compressed toward the plane of said arm by the guide edges 44 engaging the flange edge of a part as necessary to permit the cam shoulders 45 to snap into fastening engagement with such flange edge to secure an assembly such as that described with reference to Figs. 1 and 2. In order to anchor the fastener in attached position with the arms 41, 42 embracing the rib or flange on the door or other part to be secured, one or both arms 41, 42 may be provided with spurs, prongs, barbs or similar anchoring means 46 struck from the body of the spring arm and bent inwardly in position for the points of said prongs to dig into and become embedded in the rib or flange to which the fastener is attached. This form of spring fastener is advantageous in that the spaced latching elements 43 provide a fastening action at spaced points which is frequently desirable where added holding power is required to secure the parts of an installation. If desired, the free ends of one or both of the arms 41, 42, may be formed with outwardly flared lips providing an enlarged entrance for facilitating application of said arms to embracing relation on a rib or flange of a part to be secured, as and for the purposes described with reference to the form of device shown in Fig. 7.

The clip fastener in any form preferably is constructed of relatively thin sheet metal, the thickness of which is selected according to service requirements and the predetermined size of the parts of the installation. The fasteners are most effective when provided of spring metal suitably spring tempered and otherwise treated to give the desired toughness and hardness, particularly in the case of devices which are put to heavy duty in installations where the spring fasteners are frequently actuated. A cheap but effective fastener may be provided from cold rolled metal, such as cold rolled steel, which is untempered but of a spring metal nature and capable of providing an effective and reliable spring latch device adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A spring latching fastener comprising a sheet metal body having a web portion uniting a pair of gripping arms extending in opposite face to face relation in the same general direction and adapted to grip a part therebetween, a spring latching element on one arm of said pair of gripping arms comprising an element continuous with said arm adjacent said web portion and extending in the same general direction as said arm, said spring latching element being bent outwardly out of the plane of said arm from adjacent said web portion to define means adapted for fastening engagement with a cooperating part.

2. A spring latching fastener comprising a sheet metal body having a web portion uniting a pair of gripping arms extending in opposite face to face relation in the same general direction and adapted to grip a part therebetween, a spring latching element on one arm of said pair of gripping arms comprising an element continuous with said arm adjacent said web portion and extending in the same general direction as said arm, said spring latching element being bent outwardly out of the plane of said arm from adjacent said web portion and defining a shoulder adapted for fastening engagement with a cooperating part.

3. A spring latching fastener comprising a sheet metal body having a web portion uniting a pair of gripping arms extending in opposite face to face relation in the same general direction and adapted to grip a part therebetween, means on said fastener for anchoring said arms in gripping relation with said part, a spring latching element on one arm of said pair of gripping arms comprising an element continuous with said arm adjacent said web portion and extending in the same general direction as said arm, said spring latching element being bent outwardly out of the plane of said arm from adjacent said web portion to define a guide portion diverging outwardly from adjacent said web portion and merging into a shoulder adapted for fastening engagement with a cooperating part.

4. A spring latching fastener comprising a sheet metal body defining a web portion uniting a pair of gripping arms having free ends and extending in opposite face to face relation in the same general direction and adapted to grip a part therebetween, a spring latching element on one arm of said pair of gripping arms comprising an element having one end joined to said arm adjacent said web portion and having its other end extending free in the same general direction as said free ends of said gripping arms, said spring latching element being bent outwardly out of the plane of said arm from adjacent said web portion to define means adapted for fastening engagement with a cooperating part.

5. A spring latching fastener comprising a sheet metal body defining a web portion uniting a pair of gripping arms having free ends and extending in opposite face to face relation in the same general direction and adapted to grip a part therebetween, a spring latching element on one arm of said pair of gripping arms comprising an element having one end joined to said arm adjacent said web portion and having its other end extending free in the same general direction as said free ends of said gripping arms, said spring latching element being bent outwardly out of the plane of said arm from adjacent said web portion and defining a guide portion diverging outwardly from adjacent said web portion and a shoulder adapted for fastening engagement with a cooperating part.

6. A spring latching fastener comprising a sheet metal body defining a web portion uniting a pair of gripping arms having free ends and extending in opposite face to face relation in the same general direction and adapted to grip a part therebetween, means on said fastener for anchoring said arms in gripping relation with said part, a spring latching element on one arm of said pair of gripping arms comprising an element having one end joined to said arm adjacent said web portion and having its other end extending free in the same general direction as said free ends of said gripping arms, said spring latching element being bent outwardly of the plane of said arm from adjacent said web portion and defining a guide portion diverging outwardly from adjacent said web portion and merging into a shoulder adjacent said free end of said latching element adapted for fastening engagement with a cooperating part.

7. A spring latching fastener comprising a sheet metal body having a web portion uniting a pair of gripping arms extending in opposite face to face relation in the same general direction and adapted to grip a part therebetween, a spring latching element on one arm of said pair of gripping arms comprising an element formed from a side edge portion of said arm and bent outwardly out of the plane of said arm from adjacent said web portion and defining means adapted for fastening engagement with a cooperating part.

8. A spring latching fastener comprising a sheet metal body having a web portion uniting a pair of spaced gripping arms extending in opposite face to face relation in the same general direction and adapted to grip a part therebetween, means on said fastener for anchoring said arms in gripping relation with said part, a spring latching element on one arm of said pair of gripping arms comprising an element formed from a side edge portion of said arm and bent outwardly out of the plane of said arm to define a guide portion diverging outwardly from adjacent said web portion and merging into a shoulder adapted for fastening engagement with a cooperating part.

9. A spring latching fastener comprising a sheet metal body having a web portion uniting a pair of gripping arms extending in opposite face to face relation in the same general direction and adapted to grip a part therebetween, means on said fastener for anchoring said arms in gripping relation with said part, one arm of said pair of gripping arms having its two side edge portions bent outwardly out of the plane thereof to define a pair of spaced spring latching elements, said spring latching elements each comprising a guide portion diverging outwardly from adjacent said web portion and merging into a latching shoulder.

GEORGE A. TINNERMAN.

REFERENCES CITED

The following references are of record in the file of this patent:

UNITED STATES PATENTS

| Number | Name | Date |
|---|---|---|
| 738,490 | Samuel | Sept. 8, 1903 |
| 1,176,457 | Jones et al. | Mar. 21, 1916 |
| 1,637,502 | Stanton | Aug. 2, 1927 |
| 1,830,415 | Wittenberg | Nov. 3, 1931 |
| 1,945,348 | Farr | Jan. 30, 1934 |
| 2,192,160 | Tinnerman | Feb. 27, 1940 |
| 2,328,757 | Tinnerman | Sept. 7, 1943 |